3,446,774
PROCESS FOR PREPARING SILICIC ACID
ESTER SILAZANES
Hans-Joachim Kotzsch, Rheinfelden, and Mohamed Roshdy Ismail, Spich, Germany, assignors to Dynamit Nobel Aktiengesellschaft, Troisdorf, Germany, a corporation of Germany
No Drawing. Filed Aug. 2, 1967, Ser. No. 661,751
Claims priority, application Germany, Aug. 2, 1966, D 50,735
Int. Cl. C03c 17/30; C08g 31/30, 23/20
U.S. Cl. 260—47    11 Claims

ABSTRACT OF THE DISCLOSURE

A process for preparing silicic acid ester silazanes is disclosed. The silicic acid ester silazanes having the formula:

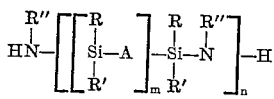

wherein R and R' are selected from the group of hydrogen, alkyl and alkenyl, R" is hydrogen or an aliphatic, cycloaliphatic or aromatic radical, A is a bivalent phenol radical, $m$ has a value of from 1 to 50 and $n$ has a value of at least 1, are prepared by reacting a precondensation product.

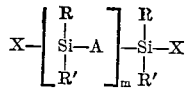

wherein R, R' and A are as previously defined and X is halogen, with ammonia and/or a primary aliphatic, cycloaliphatic or aromatic amine.

The compounds as prepared by the claimed process are suitable for use as epoxy resin hardeners and can be directly used in the manufacture of coatings adapted to be applied to the surfaces of glass and/or mineral containing objects.

---

This invention relates to silicic acid ester silazanes and to a process for their production. More specifically the invention relates to silicic acid ester silazanes having the following formula:

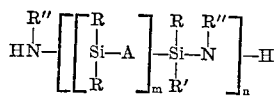

wherein R and R' which can be the same or different are each a member of the group of hydrogen, alkyl and alkenyl, R" is hydrogen or an aliphatic, cycloaliphatic or aromatic radical, A is a bivalent phenol radical, $m$ has a value of from 1 to 50 and $n$ has a value of at least 1 and depends on the degree of condensation.

The silicic acid ester silazanes as above set out are prepared by reacting a precondensation product having the following formula:

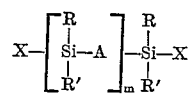

prepared in the conventional manner from a bivalent phenol and a dihalogen silane, wherein R, R', A and $m$ have the same significance as given above, and X represents halogen, with ammonia and/or a primary aliphatic, cycloaliphatic or aromatic amine.

Attempts made heretofore to prepare condensation products of similar structure by the reaction of hexamethylcyclotrisilazane with a bivalent phenol have proved entirely unsatisfactory. The known procedures have proved quite uneconomical because of the requirement for silazane as a starting material, the same being obtainable only at great expense. The starting silazane must furthermore satisfy certain purity requirements in order that polymers may be prepared therefrom having a sufficiently high degree of polymerization. Another disadvantage of the known procedure is the complete lack of uniformity in the molecule structure of the product produced and consequently the hardly reproducible chain structure of the polymers, due to the formation of disilazane and trisilazane segments which, due to their greater sensitivity, considerably impair the stability of the condsation polymers to hydrolysis, and also due to the formation of polyester segments of varying lengths.

Surprisingly, in accordance with the invention it has now been found that the above-described difficulties can be avoided in a very simple manner and silicic acid ester silazanes as above set out obtained by first preparing the precondensation products so that they are characterized by a well-defined degree of condensation and thereafter converting these into the desired silazanes by reaction thereof with ammonia and/or a primary aliphatic, cycloaliphatic or aromatic amine, i.e., there are thereby produced monomeric, oligomeric or polymeric silazanes of definite structure having a mostly uniform chain block structure. Further the results in each case are readily reproductible. The process of the invention is furthermore particularly economical because the use of the precondensation products produced by reaction of a bivalent phenol and dihalogen silane avoids having to proceed by the roundabout way of producing the cyclosilazanes. Still further the homogeneous reaction renders all of the organic silicon usable for the product, whereas the manufacture of the cyclosilazane entails the formation of considerable amounts of silazane byproducts of other structure which have to be removed, resulting in the loss of considerable amounts of organic silicon.

The bivalent phenols which are suitable for use in the manufacture of the precondensation products are those which do not form any cyclic silicic esters, i.e., the two OH groups may not be in the ortho position in relation to one another. Instances of bivalent phenols which may be used to form the precondensation products include: resorcinol, hydroquinone, bis-(4-hydroxyphenyl)-methane, bis-(4-hydroxy-3-methylphenyl)-methane, bis-(4-hydroxy-3,5-dichlorophenyl)-methane, bis-(4-hydroxy-3,5 - dibromophenyl) - methane, bis-(4 - hydroxy - 3,5-difluorophenyl) - methane, 1,1-bis-(4 - hydroxyphenyl)-ethane, 2,2 - (4 - hydroxyphenyl) - propane, 2,2 - bis-(3-hydroxyphenyl) - propane, 2,2-bis-(4-hydroxyphenyl)-butane, 2,2-bis-(4-hydroxyphenyl) - 4-(methyl)-pentane, 2,2-bis-(4-hydroxy-3-methylphenyl)-propane, 2,2-bis-(4-hydroxy-3-chlorophenyl) - propane, 2,2-bis-(4-hydroxy-3,5-dichlorophenyl) - propane, 2,2-bis-(4 - hydroxy-3,5-dibromophenyl)-propane, bis-(4-hydroxyphenyl)-phenylmethane, bis-(4-hydroxyphenyl)-phenylmethylmethane, bis - (4 - hydroxyphenyl) - diphenylmethane, bis - (4-hydroxyphenyl) - (4-methylphenyl) - methane, 1,1-bis-(4-hydroxyphenyl)-1 - (3 - methylphenyl) - propane, 1,1-bis-(4 - hydroxyphenyl) - 2,2,2 - trichlorethane, bis - (4-hydroxyphenyl) - (4-chlorophenyl) - methane, 1,1-bis-(4-hydroxyphenyl) - cyclohexan, bis - (4 - hydroxyphenyl)-cyclohexylmethane, 4,4' - dihydroxydiphenyl, 3,3',5,5'-tetramethyl - 4,4' - dihydroxydiphenyl, dihydroxy-naphthaline, 4,4'-dihydroxydiphenylsulfone, 4,4'-dihydroxydiphenylether, etc. Mixtures of any of the aforementioned bivalent phenols can also be used.

Instances of dihalogen silanes which have proven suitable for reaction with the bivalent phenol to form the precondensation product include: dimethyldichlorosilane, dichlorosilane, hydrogen methyl dichlorosilane, methylvinyldichlorosilane, diethyldichlorosilane, etc. Mixtures of any of the aforementioned dihalogen silanes can also be used.

The preparation of the precondensation products is best carried out according to the conventional method, i.e., by the reaction of the bivalent phenol in a hypostoichiometric amount and specifically using less than 1 mole of bivalent phenol per mole of dihalogen silane. The amount actually used depends on the degree of condensation of the precondensation products. Since $m$ may have any value of from 1 to 50, this means that, if $m$ is equal to 1, bivalent phenol and chlorosilane are used in a molar ratio of 1:2, and if $m$ is 50, the corresponding molar ratio amounts to 0.98:1.

Since the condensation reaction takes place more slowly as the molecule size increases, the resulting precondensation products have mostly uniform molecular sizes corresponding to the molar ratio of bivalent phenol to dihalogen silane.

The reaction of the bivalent phenol with the dihalogen silane can be carried out both in the fused state and in solution. When solvents are used, it is best to use those which are inert towards the reactants.

The precondensation can also be conducted with the use of condensation adjuvants. Instances of suitable condensation agents include catalytically active tertiary amines, such as dimethylaniline, which catalyze the splitting off of the hydrogen halide. Alternatively the condensation may be effected in the presence of stoichiometric quantities of an acid binding agent, such as an alkali or alkaline-earth carbonate or an amine which is capable of binding the released hydrogen halide so as to form alkali or alkaline-earth halides or amine hydrochlorides. If tertiary amines are used as catalysts for the splitting off of HCl it is best to use amines whose HCl tension at normal pressure is less than 760 mm. Hg. such as, for example, N,N-dimethylaniline, p-bromodimethylaniline and benzyldimethylaniline.

The precondensation products are prepared under normal pressure at temperatures of from 50 to 200° C. The use of an excess pressure of up to about 12 atmospheres may nevertheless be advantageous.

The precondensation products thus produced are, according to the invention, converted per se or after being dissolved in an inert solvent such as hydrocarbon or ether, into linear silicic acid ester silazanes of high molecular weight. This is effected by the introduction of ammonia in great excess or of gaseous amines, or by the addition of ammonia or amines in liquid form to the precondensation product. The reaction takes place rapidly, at atmospheric or less than atmospheric pressure with the precipitation of small amounts of ammonium halide. The silazane reaction products are then isolated by the conventional methods, such as, for example, by extraction, filtration or centrifugation followed by the removal of the solvent by evaporation. The silazanes are thereby obtained in the form of fused or thermoplastic masses.

In addition to ammonia, primary aliphatic, cycloaliphatic, and aromatic amines are suitable for use in the process of the invention. Those amines may be substituted by alkyl, cycloalkyl and aryl radicals as well as halogen atoms. Examples of amines which can be advantageously employed are: methylamine, ethylamine, isopropylamine, cyclohexylamine, aniline, toluidene, etc.

Excess amounts of ammonia or of the primary amine are added to the precondensation products in solution under temperature control effected by means of a circulating bath, whereby the silazane esters develop in an exothermic reaction. If desired, the reaction is carried out under initial pressures of up to 20 atmospheres. Temperatures of 20 to 180° C. and preferably of 25 to 120° C. are preferably employed. The ammonium halides that form in the reaction forming the silazane do not interfere with the reaction, instead, they accelerate the condensation to linear polymers. The formation, according to the invention, of linear, polymeric silazane esters as taught herein is to be considered especially surprising, because in the case of silazanes, cyclization as a rule results in stable ring compounds.

Suitable inert solvents both for the manufacture of the precondensation products and for the reaction of the latter with ammonia and/or primary amine for use in the process of the invention include both aliphatic and aromatic hydrocarbons as well as simple and cyclic ethers. Suitable aliphatic hydrocarbons are both simple compounds and mixtures such as isooctane and benzine fractions, as for example, those having a boiling range from 120 to 180° C. Benzene, toluene and xylene are examples of suitable aromatic hydrocarbons. Ethers which can be used in the reactions are, for example, diisopropylether, diisoamylether, diphenylether, 1,4-dioxane and the like. The foregoing list of suitable ethers shows that both aliphatic and aromatic, open-chain and cyclic ethers can be used.

The products manufactured according to the invention are thermoplastic resins and represent synthetic products which are suitable for use, for example, as components for resins as hardeners for epoxy resins, as components for varnishes and for the manufacture of coatings to be applied onto glass and mineral objects. They can be used per se for coating glass and mineral objects by dipping into melts of the products according to the invention. The silazanes of the invention have a very high thermal stability.

The examples given hereinafter serve to illustrate the invention without being in any way or form considered as limitative of the scope of the same.

EXAMPLE 1

0.5 mole of 2,2-bis-(4-hydroxyphenyl)-propane (Bisphenol A or dian) suspended in 600 ml. of hexane were introduced into a one-liter flask equipped with an anchor agitator and a reflux condenser, and the apparatus and contents were then dried by distillation. Thereafter 1 ml. of N,N-dimethylaniline was added as catalyst, and 0.55 mole of dimethyldichlorosilane was dripped into the agitated suspension at a temperature of 60 to 65° C. within 3 hours. After 7 hours had elapsed, 0.7 mole of HCl had been liberated. Following a further 4 hours of boiling in the reflux condenser an additional 0.3 mole of HCl was liberated, completing the reaction. Ammonia was then introduced into the boiling solution for 3 hours. As a result ammonium chloride was precipitated and the solution became obviously viscous. The batch was filtered through glass wool while hot. By concentration in vacuo using a temperature of about 80° C., 120 g. of polydimethylsilazanedianyl ester having a flow point of 56° C. was isolated from the filtrate. The reduced viscosity of a solution of 0.5% by weight of the polydimethylsilazanedianylester in toluene at 25° C. was about 1.12.

Analysis.—[$(C_{17}H_{20}O_2Si)_{10}C_2H_7NSi$]. Calculated: C, 70.9%; H, 7.16%; Si, 10.56%; N, 0.5%. Found: C, 70.72%; H, 7.36%; Si, 10.59%; N, 0.4%.

EXAMPLE 2

According to the procedure set out in Example 1, 0.4 mole of 2,2-bis-(4-hydroxyphenyl)-propane (Bisphenol A) was precondensed with 0.5 mole of vinylmethyldichlorosilane and reacted with ammonia. 122 g. of polymethylvinylsilazanedianylester having a flow point of 48° C. were thereby obtained. The reduced viscosity of a solution of 0.5% by weight of the polymethylvinylsilazanedianylester in toluene at 25° C. amounted to about 1.08.

Analysis.—[$(C_{18}H_{20}O_2Si)_4C_3H_7NSi$]. Calculated: C, 70.94%; H, 6.92%; Si, 11.02%; N, 1.10%. Found: C, 70.48%; H, 7.13%; Si, 11.08%; N, 1.24%.

EXAMPLE 3

Using an apparatus similar to that described in Example 1, 0.2 mole of (Bisphenol A) was dissolved in 600 ml. of a solvent mixture consisting of equal volumes of benzene and toluene and the solution thereafter distilled. Thereafter 0.5 ml. of N,N-diethylaniline and 0.4 mole of carefully distilled methyldichlorosilane were added at 30° C. with agitation. After about 20 hours of agitation at 40° C. with a reflux condenser running at −30° C., 0.4 mole of HCl had been liberated. The condenser was transferred over to water cooling and the mixture was boiled for 2 hours with refluxing. The mixture was then further condensed with ammonia as set out in Example 1 and separated. 58 g. of polyhydrogenmethylsilazane-dianylester were isolated. The reduced viscosity amounted to 0.5 determined as above. A Zerewitinoff determination carried out with normal ethanolic KOH showed 0.34% hydrogen bound to silicon (calculated 0.30%). The silicon was determined and amounted to 16.7%, and the nitrogen to 4.3%. These values agree with the calculated values of 17.0% silicon and 4.25% nitrogen.

EXAMPLE 4

Following the procedure described in Example 1, 0.4 mole of p,p′-diphenol was precondensed with 0.6 mole of dimethyldichlorosilane and reacted with methylamine. 104 g. of poly-N-methyldimethylsilazane-p,p′-diphenylester, having a flow point of 56° C. and a redued viscosity of 1.21 (determined as above) were isolated.

EXAMPLE 5

0.4 mole of resorcinol was precondensed as set out in Example 1 with 0.6 mole of dimethyldichlorosilane, using 400 ml. of xylene as solvent. Then, 0.6 mole of aniline was added drop by drop to the violently boiling solution over a period of 2 hours, and the mixture was stirred for 20 hours at 180° C. bath temperature. After filtering off the aniline hydrochloride, the solution was concentrated by evaporation at a temperature rising to about 260° C., and in vacuo towards the end, whereupon poly-N-phenyl-dimethylsilazanersorcylester was obtained as the residue. The product had a flow point of 73° C. and a reduced viscosity of 0.4 (determined as above).

EXAMPLE 6

0.4 mole of p,p′-diphenol was precondensed as set out in Example 1 with 0.6 mole of methyl-n-propyldichlorsilane until liberation of HCl ceased. Thereafter the resulting product was reacted with 0.4 mole of cyclohexylamine. After filtering off the cyclohexylamine hydrochloride, the solution was concentrated by evaporation at a temperature rising to about 260° C., and in vacuo towards the end, whereupon poly-N-cyclohexyl-methyl-n-propyl-siliazane-p,p′-diphenylester was obtained as the residue. The product had a flow point of 50° C. and reduced viscosity of 0.6 (determined as above).

What is claimed is:

1. Process for the preparation of silicic acid ester silia-zanes of the formula:

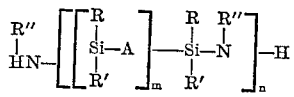

wherein each of R and R′ is a member selected from the group consisting of hydrogen, alkyl and alkenyl, R″ is a member selected from the group consisting of hydrogen and aliphatic, cycloaliphatic and aromatic radicals, A is a bivalent phenol radical, $m$ has a value of from 1 to 50 and $n$ has a value of at least 1 which comprises reacting a precondensation product having the formula:

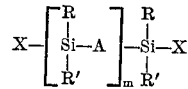

wherein R, R′, A and $m$ are as above and X is halogen, with at least one member selected from the group consisting of ammonia and primary aliphatic, cycloaliphatic and aromatic amines.

2. Process according to claim 1 wherein said precondensation product is obtained by reacting a bivalent phenol with a dihalogen silane at a temperature of from 50 to 200° C.

3. Process according to claim 2 wherein said bivalent phenol is used in a hypostoichiometric amount referred to said dihalogen silane.

4. Process according to claim 2 wherein said precondensation product is obtained by reacting said bivalent phenol with said dihalogen silane in a molar ratio of 0.5 to 0.98:1.

5. Process according to claim 2 wherein said reaction of said biphenol and dihalogen silane is conducted in the presence of 0.1 to 2 mol-percent of a tertiary amine referred to said dihalogen silane.

6. Process according to claim 2 wherein said dihalogen silane is a member selected from the group consisting of dimethyldichlorosilane, dichlorosilane, hydrogen methyl dichlorosilane, methylvinyldichlorosilane, diethyldichlorosilane, and mixtures thereof.

7. Process according to claim 2 wherein said divalent phenol is 2,2-bis-(4-hydroxyphenyl)-propane and said dihaogen silane is dimethylidichlorsilane.

8. Process according to claim 2 wherein said divalent phenol is 2,2-bis-(4-hydroxyphenyl)-propane and said dihalogen silane is dimethyldichlorosilane.

9. Process according to claim 2 wherein said divalent phenol is p,p′-diphenol and said dihalogen silane is dimethyldichlorosilane.

10. Process according to claim 2 wherein said divalent phenol is resorcinol and said dihalogen silane is dimethyldichlorosilane.

11. Silicic acid ester silazanes of the formula:

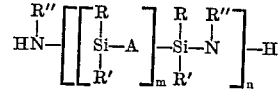

wherein each of R and R′ is a member selected from the group consisting of hydrogen, alkyl and alkenyl, R″ is a member selected from the group consisting of hydrogen and aliphatic, cycloaliphatic and aromatic radicals, A is a bivalent phenol radical, $m$ has a value of from 1 to 50 and $n$ has a value of at least 1.

References Cited

UNITED STATES PATENTS 3,341,494  9/1967  Millward _____ 260—47
3,366,593  1/1968  Breed et al. _____ 260—33.6

DONALD E. CZAJA, Primary Examiner.

M. I. MARQUIS, Assistant Examiner.

U.S. Cl. X.R.

117—124; 260—46.5, 2

UNITED STATES PATENT OFFICE
CERTIFICATE OF CORRECTION

Patent No. 3,446,774                                    May 27, 1969

Hans-Joachim Kotzsch et al.

It is certified that error appears in the above identified patent and that said Letters Patent are hereby corrected as shown below:

Column 1, line 49, in the formula, "R″" should read -- R′ --.
Column 6, line 36, "dimethyldichlorosilane" should read -- vinylmethyldichlorosilane --.

Signed and sealed this 10th day of March 1970.

(SEAL)
Attest:

Edward M. Fletcher, Jr.                     WILLIAM E. SCHUYLER, JR.
Attesting Officer                               Commissioner of Patents